(12) United States Patent
Craine

(10) Patent No.: US 8,738,538 B2
(45) Date of Patent: *May 27, 2014

(54) BARTER FOR RIGHTS

(71) Applicant: AT&T Intellectual Property I, L.P., Atlanta, GA (US)

(72) Inventor: Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,838

(22) Filed: Jul. 12, 2013

(65) Prior Publication Data
US 2013/0297444 A1 Nov. 7, 2013

Related U.S. Application Data

(63) Continuation of application No. 11/950,596, filed on Dec. 5, 2007, now Pat. No. 8,489,510.

(51) Int. Cl.
*G06F 21/00* (2013.01)
*G06F 21/10* (2013.01)
*G06Q 30/06* (2012.01)

(52) U.S. Cl.
CPC ............ *G06F 21/10* (2013.01); *G06Q 30/0601* (2013.01); *G06Q 30/0611* (2013.01); *G06Q 2220/18* (2013.01)
USPC ............. 705/59; 705/26.1; 705/26.4; 705/51; 705/52; 705/57

(58) Field of Classification Search
CPC .......... G06Q 2220/18; G06Q 30/0601; G06Q 30/0611; G06F 21/10
USPC ............................... 705/26.1, 26.4, 51–52, 57
See application file for complete search history.

(56) References Cited

U.S. PATENT DOCUMENTS

| | | | |
|---|---|---|---|
| 7,581,166 B2 | 8/2009 | Renger et al. | |
| 2001/0049648 A1 | 12/2001 | Naylor et al. | |
| 2002/0161697 A1 | 10/2002 | Stephens et al. | |
| 2002/0198843 A1* | 12/2002 | Wang et al. | 705/51 |
| 2004/0199471 A1* | 10/2004 | Hardjono | 705/50 |
| 2006/0173701 A1 | 8/2006 | Gurvey | |
| 2006/0173985 A1 | 8/2006 | Moore | |
| 2006/0229989 A1* | 10/2006 | Fontijn | 705/50 |
| 2007/0156594 A1 | 7/2007 | McGucken | |
| 2008/0155614 A1 | 6/2008 | Cooper et al. | |
| 2008/0275753 A1 | 11/2008 | Protheroe et al. | |

* cited by examiner

*Primary Examiner* — Calvin Cheung
(74) *Attorney, Agent, or Firm* — Parks IP Law LLC; Mickki D. Murray, Esq.

(57) ABSTRACT

Selling intangible property rights may include receiving content from a seller and determining one or more potential purchasers for the content's intangible property rights. The potential purchasers may be determined according to the subject of the content, the audience for the content, and the intangible property rights being sold. An offer to sell the intangible property rights may then be transmitted to one or more potential purchasers, along with a portion of the content. Upon receiving the one or more purchaser's acceptance of the offer, a complete copy of the content may be transmitted to the purchaser.

20 Claims, 6 Drawing Sheets

BARTER FOR RIGHTS

FIELD OF THE DISCLOSURE

The present disclosure relates to the sale of intangible property rights, such as the right to display an image.

BACKGROUND

Intangible property, which is protected by patents, trademarks and/or copyrights, has many of the same rights and privileges as real property. For example, intangible property can be bought, sold, traded, or licensed just like real property.

When intangible property is sold or licensed, the seller my sell the exclusive or non-exclusive rights to the intangible property. For example, a newspaper can purchase the exclusive right to use a photograph for its newspaper or website, thus preventing its competitors from using the image. Alternatively, a news service may purchase the non-exclusive right to use the photograph in its newspapers, while a magazine may purchase the rights to use the photograph in its magazines. Non-exclusive use rights can be restricted by any number of different limitations including: geographic location, time, media type, number of uses, type of use, or any other limitation that the parties agree to. By selling the non-exclusive rights to a photograph to several parties, a photographer may acquire a greater return for their photograph.

With the advent of on-line news services, 24-hour cable news networks, and specialty magazines and periodicals, there is a growing demand for news and current events. This, in turn, has created a number of new markets for the latest news and information.

Accordingly, independent news reporters, photographers, and individuals involved in gathering news and current events require a way to access these many markets and sell their photographs, stories, and interviews, etc.

SUMMARY

This summary is provided to introduce ways of selling intangible property rights, which are further described below in the Detailed Description. This summary is not intended to identify the essential features of the claimed subject matter, nor is it intended for determining the scope of the claimed subject matter.

In one implementation, a method of selling intangible property rights includes receiving content from a seller and determining potential buyers for the contents intangible property rights. The potential buyers are determined according to the content's subject, audience, and the intangible property rights being offered for sale. An offer containing a portion of the content is transmitted to the potential buyers. The complete content is then sent to the potential buyers once they've accepted the offer.

In another implementation, a device for selling intangible property rights includes one or more processors, memory accessible by the one or more processors, a purchaser module, an offer module, and an acceptance module. The purchaser module determines one or more potential purchasers for the intangible property rights associated with received content according to the subject of the content, an audience for the content, and the intangible property rights being sold. The offer module transmits an offer to purchase the intangible property rights directly to the one or more potential purchasers. Finally, the acceptance module receives an acceptance of the offer from the one or more potential purchasers.

Other systems, methods, and/or computer program products according to embodiments will be or become apparent to one with skill in the art upon review of the following drawings and detailed description. It is intended that all such additional systems, methods, and/or computer products be included within this description, be within the scope of the present disclosure, and be encompassed by the accompanying claims.

BRIEF DESCRIPTIONS OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

Sales of intangible property rights are described below. As noted, with the advent of on-line news services, 24-hour cable news networks, and specialty magazines and periodicals, there is a growing demand for news and current events. Accordingly, independent news reporters, photographers, and individuals involved in gathering news require a way to access these markets to sell their photographs, video clips, audio clips, stories, and interviews.

Figure 1:
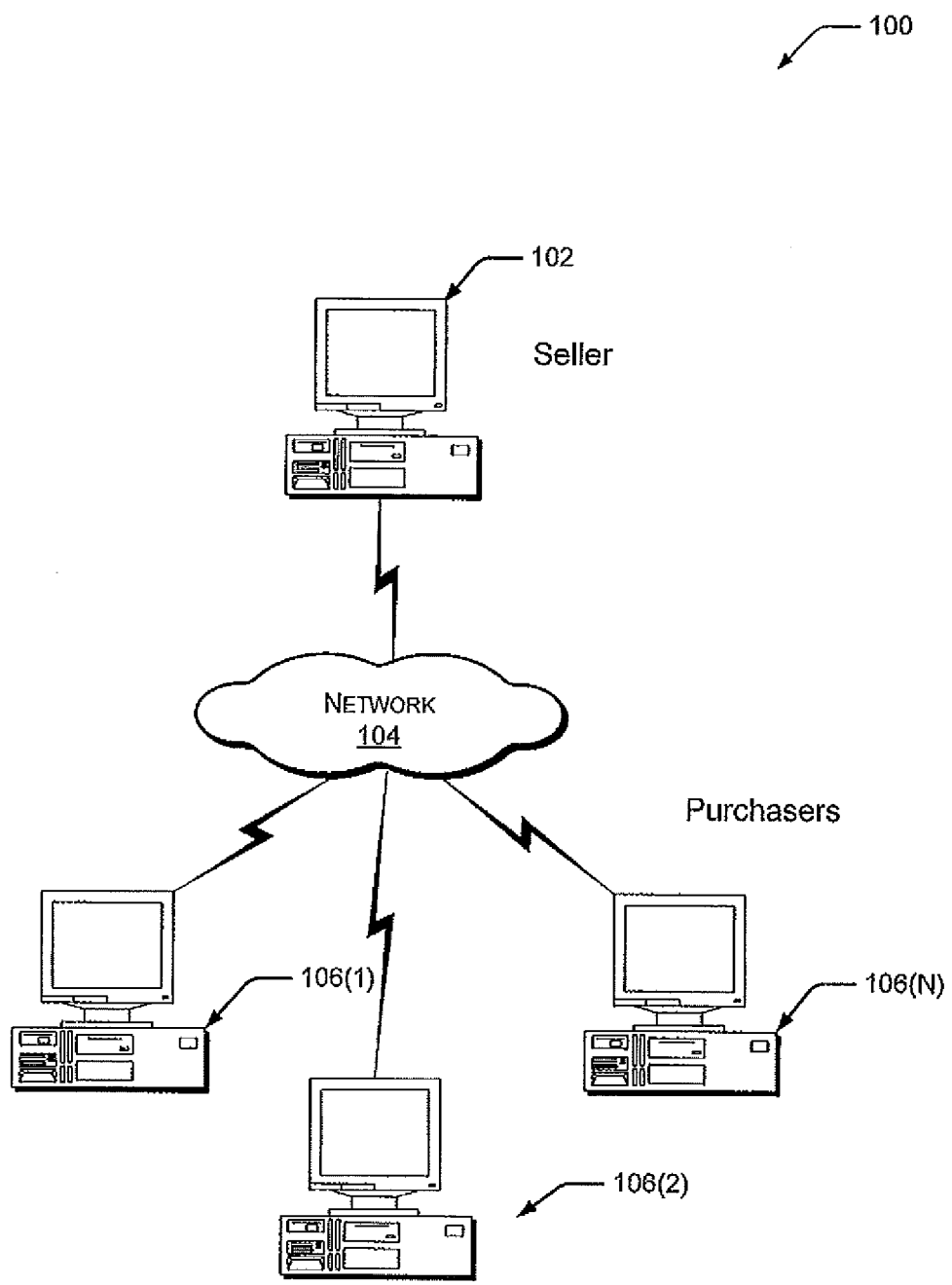
FIG. 1 depicts an illustrative system for selling intangible property rights in accordance with an embodiment.

With this in mind, FIG. 1 depicts an illustrative system 100 for processing and transmitting data in accordance with an embodiment of the present disclosure. The system 100 includes at least one seller's computing device 102, a network 104, and one or more purchaser computing devices 106 (1)-(N), where N is an integer. For ease of illustration, the system is illustrated and described as including one seller device 102. However, it should be appreciated that there may be any number of seller devices 102.

The seller's computing device 102 may provide server and storage services for the purchaser computing devices 106 via the network 104. The seller's device 102 may include one or more computer processors capable of executing computer-executable instructions. For example, the seller's device 102 may be a mobile computing device, a personal computer, a work station, a main frame computer, a network computer, or any other suitable computing device. The seller's computing device 102 captures and/or receives content from a seller, determines potential purchasers for the contents intangible property rights, transmits an offer to purchase the intangible property rights, and receives one or more purchaser's acceptance of the offer. The seller's computing device 102 may be coupled to the data network 104 through a wired or a wireless data interface.

The network 104 could be a wide area network (WAN), such as the Internet, which links together many computing devices and spans the globe. Alternatively, the network 104 could be a local area network (LAN), which links a limited number of computing devices and spans a business or company, for example.

The purchaser's computing device 106, could include a mobile computing device, a laptop computer, a desktop computer, a notebook computer, a personal digital assistant (PDA), or any other suitable computing device. The purchaser's computing device 106(1)-(N) may be coupled to the data network 104 through a wired or a wireless data interface.

Figure 2:
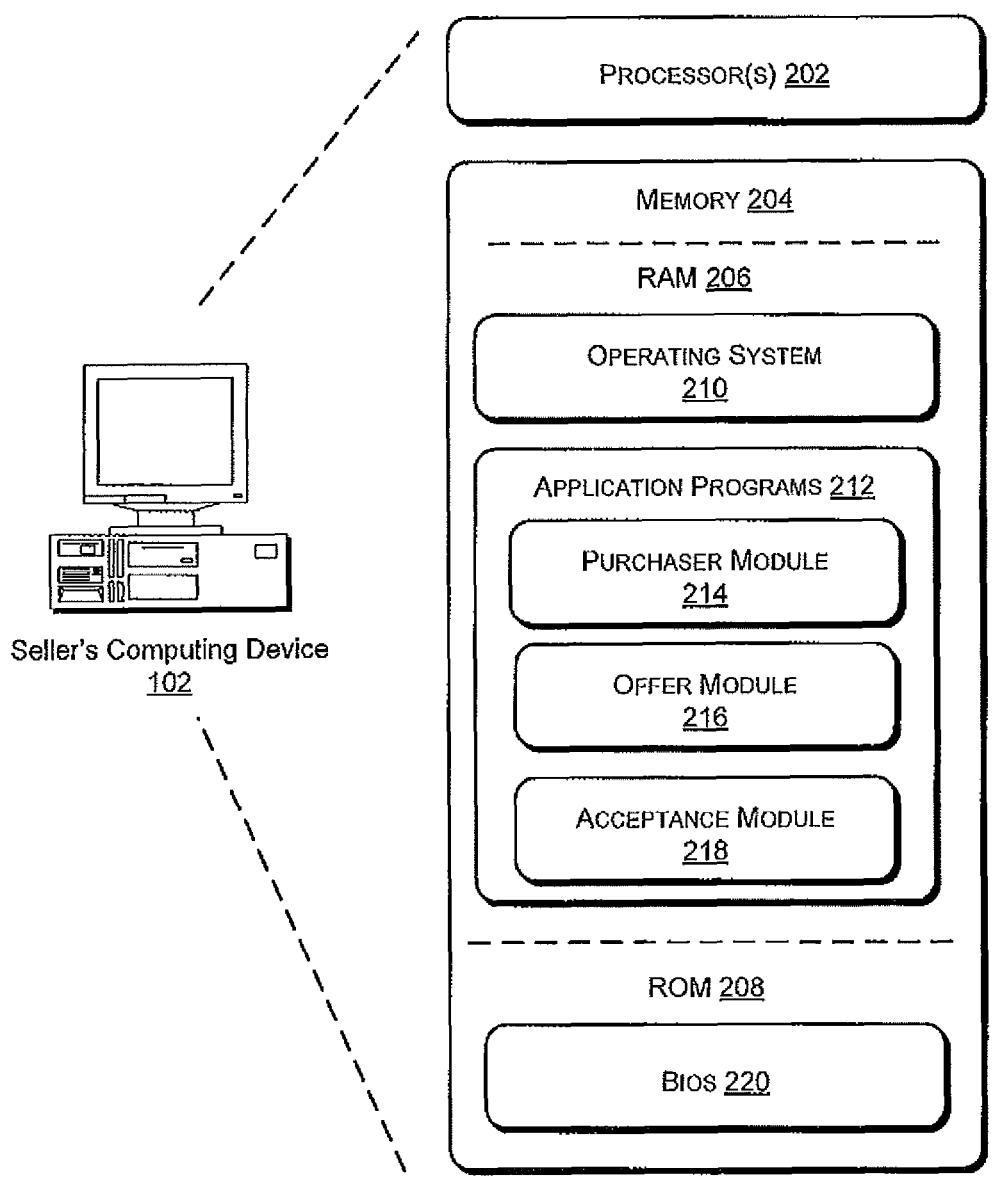
FIG. 2 depicts an illustrative computing device in accordance with an embodiment.

Having described the system 100 for processing and transmitting data, the discussion now shifts to the seller's computing device 102. FIG. 2 depicts an illustrative seller's computing device 102, which can be used to implement the techniques described herein. The components of the seller's computing device 102 may include one or more processors 202, a system memory 204, and a system bus (not shown) that couples various system components together.

The seller's computing device 102 may also include volatile memory, such as random access memory (RAM) 206, and non-volatile memory, such as read only memory (ROM) 208. A basic input/output system (BIOS) 220, which contains the basic routines for transferring information between elements of the seller's device 102, is stored in ROM 208. The data and/or program modules that are currently being used by the processor 202 are stored in RAM 206 and/or ROM 208. The seller's computing device 102 may also include other computer storage media such as a hard drive, a magnetic disk drive (e.g., floppy disks), an optical disk drive (e.g., CD-ROM, DVD, etc.) and other types of computer-readable media such as flash memory cards.

A seller can enter commands and information into his computing device 102 via a variety of input devices including a keyboard and a pointing device (e.g., a mouse, a touch pad, a touch screen, etc.). Alternatively, the seller may enter commands and information orally via voice recognition. The seller may view the content via a monitor or other display device that is connected to the system bus via an interface, such as a video adapter.

As noted, the seller's computing device 102 operates in a networked environment using logical connections and may be connected to one or more servers (not shown). As noted, the seller's device 102 and purchaser's devices 106 may be coupled through a wide area network (WAN) or local area network (LAN). Such networking environments are commonplace in offices, enterprise-wide computer networks, intranets, and the Internet.

Any number of program modules can be stored in memory 204, including an operating system 210, one or more application programs 212, and program data. Generally, program modules include routines, programs, objects, components, data structures, etc. that perform particular tasks. In this case, there is a "purchaser module" 214, an "offer module" 216, and an "acceptance" module 218.

The purchaser module 214, analyzes the content to determine the subject of the content, a potential audience for the content, the intangible property rights that should be offered for sale, and compiles a list of potential purchasers for the intangible property rights. Alternatively, the purchaser module 214 may also generate a set of terms, such as price, associated with the intangible property rights.

Once the potential purchasers, intangible property rights, and terms have been determined, the offer module 216 compiles this information along with the image into an offer and sends it to the potential purchasers.

Finally, the acceptance module 218, receives one or more potential purchasers' acceptance(s) of the offer. Alternatively, the potential purchasers may submit a counter offer. In the case of a counter offer, the acceptance module 218 may analyze the counter offer and either accept or reject it. Alternatively the acceptance module 218 may query the seller whether to accept the counter offer.

Figure 3:
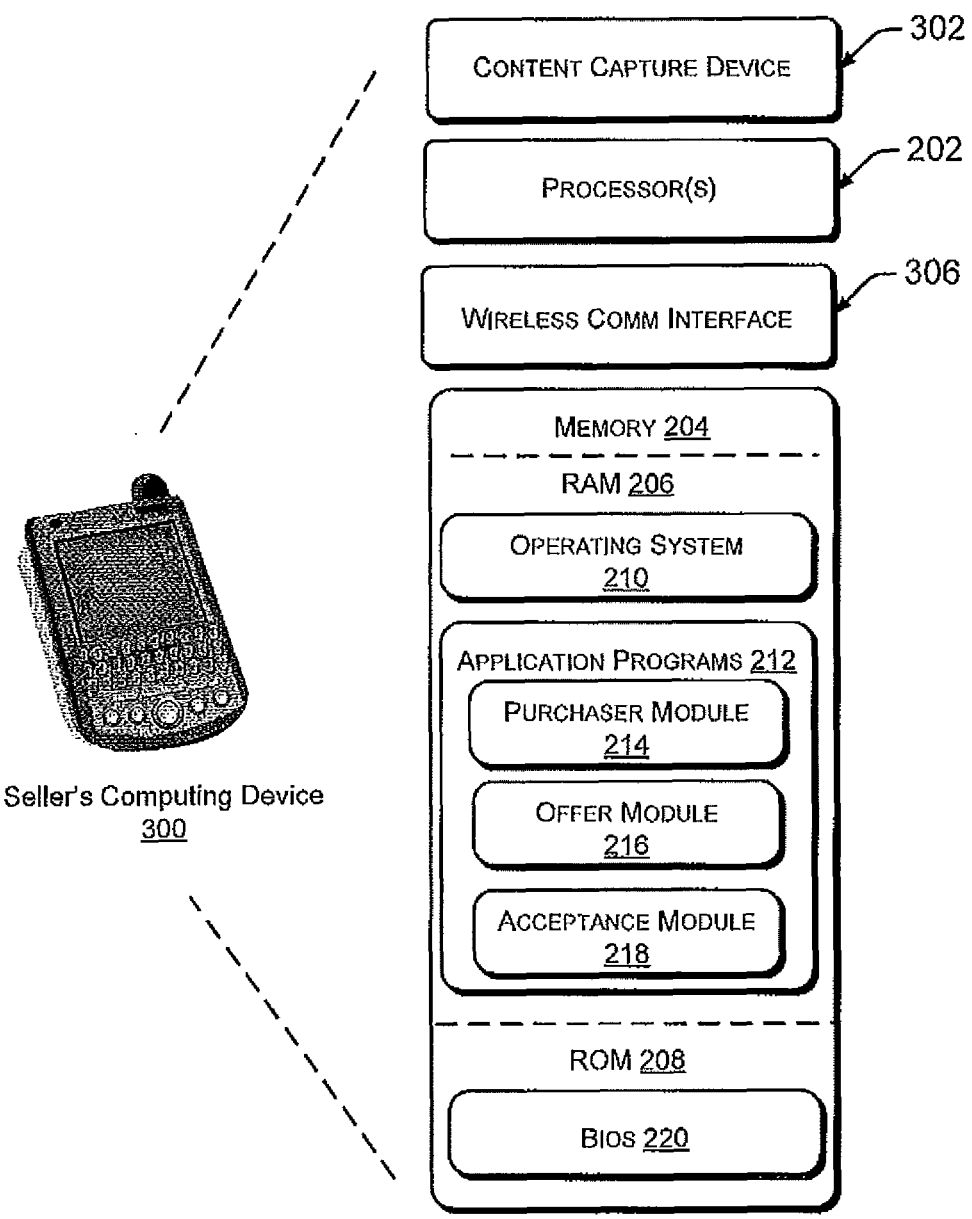
FIG. 3 depicts an illustrative computing device in accordance with another embodiment

In an alternate embodiment, the seller's computing device 102 may be a mobile or portable computing device that could be carried in the field by a news reporter, photographer, or individual involved in gathering news and current events. FIG. 3 depicts an illustrative a portable computing device 300 for capturing, processing, and transmitting content in accordance with an illustrative embodiment.

The mobile computing device 300 may be a cellular phone, a personal digital assistant (PDA), a digital camera or any other suitable portable computing device. The mobile computing device 300 may include a content capture device 302, one or more processor(s) 202, a wireless communications interface 306, memory 204, and a user interface (not shown)

The content capture device 302 may include a digital camera video recorder for capturing digital images, a microphone for capturing sound, or other suitable content capture devices. Once the content has been captured, it is processed by the processor(s) 202 to place it in the proper format for later processing and transmission. In some instances the content may be compressed. For example, still images may be compressed and stored in joint photographic experts group (JPEG) format or tagged image file format (TIFF), among other formats. Digital video may be compressed and stored in moving pictures experts group (MPEG) format, for example.

The mobile computing device 300 may contain a wireless communications interface 306, which may employ a number of wireless communications protocols to communicate with the network 104 or directly with the purchaser's computing devices 106. These protocols may include; BLUETOOTH (Bluetooth System, version 1.1 Feb. 22, 2001), WiFi (IEEE standard 802.11), infrared (IrMC version 1.1), cellular communications network (G2 and G3 standards), radio frequency (e.g., switched mesh) and other suitable wireless communications formats.

Figure 4:
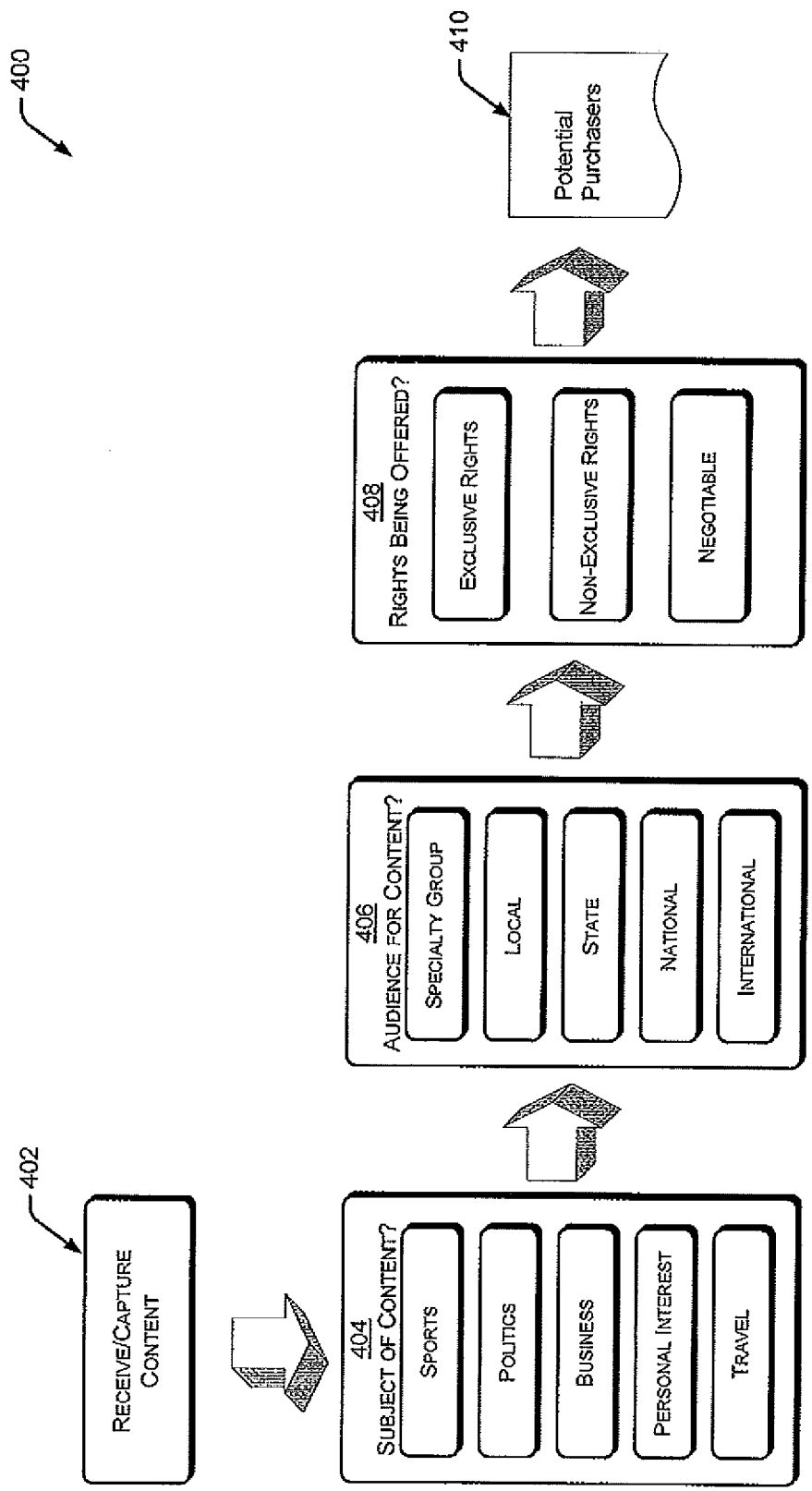
FIG. 4 depicts a method of determining one or more potential purchasers in accordance with an embodiment.

With the program modules in mind, FIG. 4 depicts an illustrative method of identifying potential purchasers for the contents intangible property rights. First, the content (i.e., image, video, audio, written text, etc.) is received from a news reporter, photographer, or other source, at block 402. Alternatively, the news reporter, photographer, or individual involved in gathering news may capture the content using their portable computing device 300. If the content was a digital image file, a digital video file, or a digital audio file it could be in a variety of different formats (e.g., PEG, TIFF, BMP, PNG, MPEG, AVI, MP3, or WAVE, just to name a few). If the content was a still image such as a photograph or hard copy of an image, it could be scanned and converted into a digital image.

Once the content has been received, it is analyzed to determine the subject of the content, at block 404. If the content where an image, it could be analyzed by a computer vision system which evaluates the image and determines its subject matter based on pattern recognition and machine learning. Alternatively, the image could include information, such as metadata or a written explanation, which describes or specifies the subject of the image. Then again, the image could be characterized manually by a person familiar with news and current events. The content can be characterized or categorized in a number of different ways, including news related categories (e.g., sports, politics, business, current events, etc.), personal interest related categories (e.g., personal interest, travel, family, real estate, etc.), or any other suitable methods of categorizing the content.

Once the content has been categorized as to the subject of the content, a potential audience for the content is determined, at block 406. The potential audience could be determined by an algorithm which applies the contents description (e.g., subject matter, where the content was captured, etc.) to a list of potential audiences (e.g., local, state, national, international, etc.) Again, the content may include information such as tags, metadata or a written description, which specifies the potential audience for the content. Alternatively, the potential audience could be determined manually by a person familiar with the interests of various audiences.

Once the content has been described and/or characterized 404 as to its subject, and a potential audience for the content has been identified 406, the algorithm determines which intangible property rights should be sold, at block 408. The intangible property rights could be exclusive, non-exclusive, or they could be negotiated by the seller and purchaser. An exclusive right may grant the holder the exclusive right to display an image, reproduce the image, distribute the image, create derivative works, etc. For example, a magazine publisher with an exclusive display right could print the image on the cover of its magazines, post the image on its website, and make derivative works (e.g., place the image on a tee shirt). A non-exclusive right may grant the holder a limited right to display the image. This could include a limited display time (i.e., display image for 1 week), a geographic limitation (i.e., only display image in New York), a media limitation (i.e., only display image in magazines), a limited number of copies (i.e., only print 1000 copies), or any other suitable limitation. For example, a news service (i.e., CNN™) could have the exclusive right to display the image during the first day and then other news services (i.e., ABC™) could have the non-exclusive right to display the image thereafter.

Alternatively, once the contents subject, potential audience, and property rights being sold have been determined, the purchaser module 214 may calculate a price associated with the intangible property right. The price could be based on the market value for a similar item of content (e.g., similar image, video clip, audio clip, story, etc), a price agreed to in a previous negotiation, the cost to acquire a comparable item of content, or any other means of determining the value of the intangible property right. Alternatively, the price for the intangible property right could be determined by a person familiar with market values of similar intangible property rights.

Given the subject of the content determined at block 404, the audience for the content determined at block 406, the property rights being sold as determined at block 408, and/or the price for the property right, the purchaser module 214 then determine one or more potential purchaser(s) for the property right at block 410. The potential purchasers could be determined based on their prior purchases, the audiences they serve, the geographic regions they serve, the news subjects they report, the type of news media they publish, or any other suitable selection criteria. The potential purchasers, along with their selection criteria, could be compiled in a searchable computer data base. The purchaser module 214 could then search the database for potential purchasers using the selection criteria. For example, if the content was an image of a fireman saving an infant from a burning building. The image would be of personal interest, it may have a local or state wide audience, and most likely only be published in a newspaper. Accordingly, the images display rights would be offered to local and state wide newspaper publishers.

Having determined the potential purchasers at block 410, the property rights being offered at block 408, and/or a price for those rights, the offer module 216 compiles and transmits an offer to the potential purchaser(s), as described with reference to FIG. 5 below. The offer could be an electronic offer (e.g., E-mail, posting to website, etc.), a written offer (e.g., letter, telegram, fax, etc.), or any other suitable means of communicating an offer to a potential purchaser.

Figure 5:
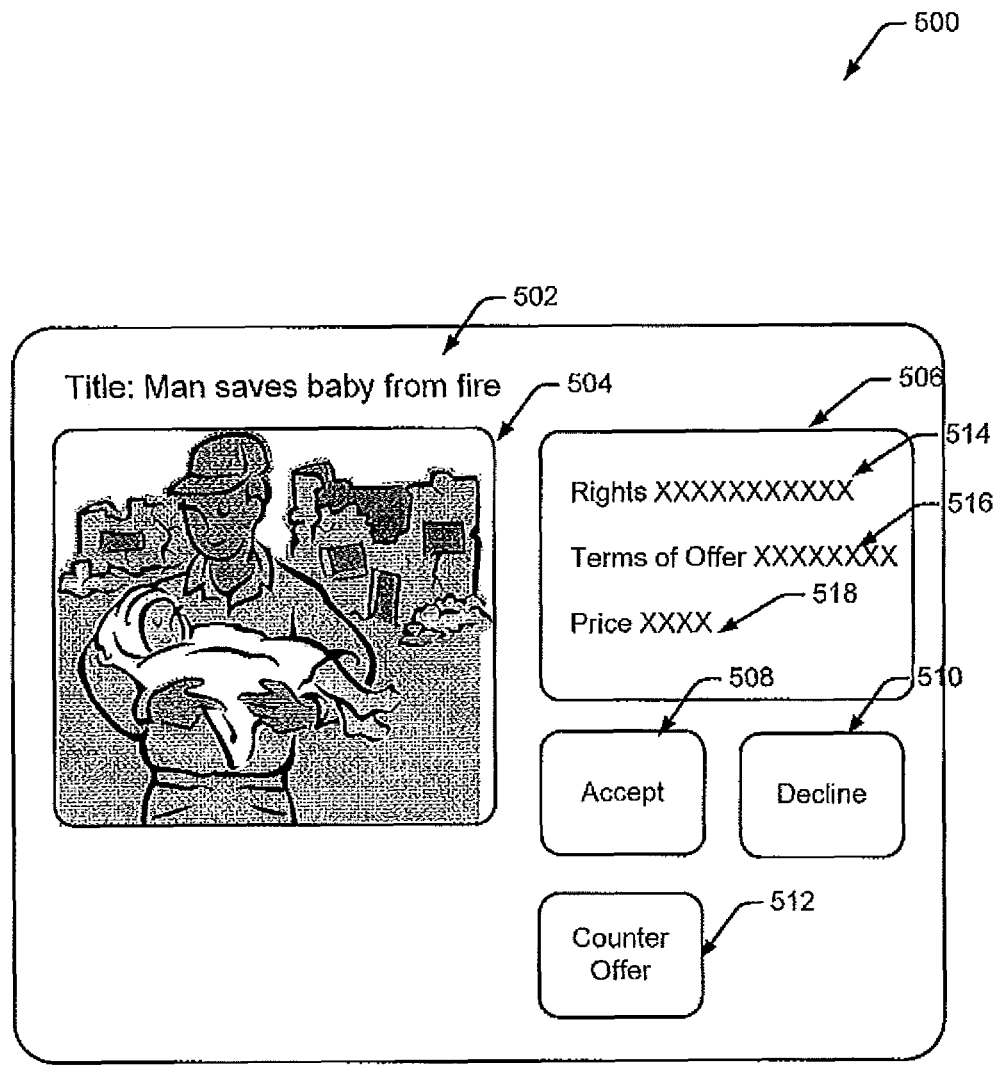
FIG. 5 depicts an illustrative offer to purchase intangible property rights in accordance with an embodiment.

FIG. 5 depicts an illustrative offer 500 that could be communicated to potential purchaser(s) via the network 104 and/or directly to the potential purchaser(s). The offer 500 may include a title 502 describing the content, the content itself 504, terms of use 506, and/or a series of links 508-512 that one or more potential purchaser(s) could use to respond to the offer. The title 502 could be a short phrase describing the content, a headline, search terms, or any other useful description of the content.

The content 504 could be transmitted to the potential purchaser(s) in a number of different forms and/or formats. If the seller and potential purchaser had negotiated a number of prior transactions, the seller may transmit the content directly to the potential purchaser. Alternatively, if the parties had not transacted business before, the seller might encrypt the content so that it could not be copied (e.g., Tages, Content Scramble System, etc.), add a watermark (e.g., property of XYZ corp.), or obscure the content (e.g., low resolution image, partial image, etc.).

The terms of use 506 may indicate the rights being purchased 514 (e.g., exclusive or non-exclusive property rights), the terms of the offer 516 (e.g., suitable forms of accepting the offer, payment terms, resolving disputes, etc.), and the price 518. The offer 500 may also include a series of links 508-512 that a potential purchaser may use to accept the offer 508, decline the offer 510, or submit a counter offer 512. Additionally or alternatively, the potential purchaser(s) could accept the offer by E-mailing, calling, faxing, etc. the seller of their acceptance.

Once the offer 500 has been accepted 508, using for example the acceptance link 508, the potential purchaser pays for the property right. If the seller has transmitted the actual content to the purchaser, the seller takes no further action. Alternatively, if the seller sent an encrypted, watermarked, or obscured copy of the content, or otherwise sent less than the entire usable content, the seller may send the purchaser an encryption key or a usable copy of the content.

Having described the system 100 for processing and transmitting content, an illustrative seller's computing device 102/300, an illustrative method for determining potential purchasers 400, and an illustrative offer 500, the discussion now shifts to methods of selling intangible property rights.

Figure 6:
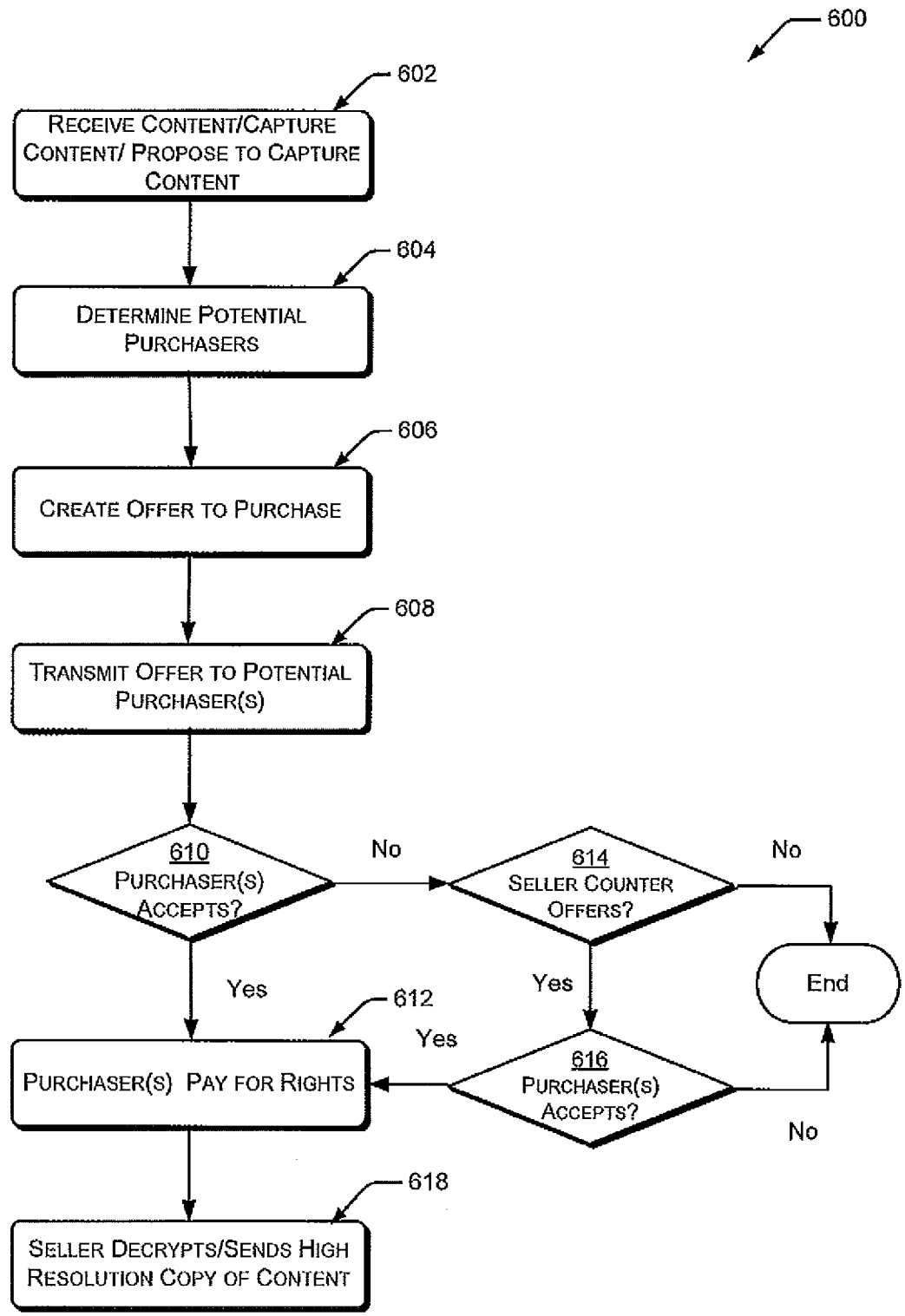
FIG. 6 is a block diagram illustrating a method of selling intangible property rights in accordance with yet another embodiment.

FIG. 6 depicts an illustrative process 600 of selling intangible property rights. At block 602, the content is received and/or captured, for example by a photographer, independent news reporter, independent news gatherer, etc. Alternatively, the news gatherer or other source may propose to capture a specific piece of content (e.g., take a picture, get a story, get an interview, etc.). The term content should be interpreted broadly, and may include a digital image, a video clip, an audio clip, a photograph, a drawing, a painting, a sketch, a computer animation, or any other suitable audio/video representation.

Once the content has been received, captured, and/or the news gatherer has agreed to capture the content, an application program 214 determines potential purchasers for the content, at block 604. As noted, the potential purchasers are determined based on the subject of the content, the potential audience for the content, and the intangible property rights being offered for sale. Alternatively, the application program 214 could determine a price associated with the content's intangible property rights.

Once the intangible property rights being offered, the potential purchasers, and/or the price have been determined, an offer to purchase the rights 500 is created, at block 606. As noted, the offer 500 could include a title or words describing the content 502, a copy of the content 504, terms of the offer 506, and/or links 508-512 allowing potential purchasers to respond to the offer 500. The offer 500 could be in any suitable format including electronic form (e.g., E-mail, text message, fax), written form (e.g., letter, note), or any other suitable means of communicating an offer 500 to a potential purchaser. The offer 500 may also include a set of terms or conditions 516 (e.g., suitable forms of accepting the offer, payment terms, resolving disputes, etc.).

Once the offer 500 has been created at block 606, the offer 500 is transmitted to the potential purchaser(s), at block 608. The offer 500 could be transmitted to the potential purchasers by a variety of different methods and formats including electronically (e.g., E-mail, text message, fax, post to a website, etc.), written communications (e.g., letter, note, postcard, etc.), or any other suitable form of communicating the offer 500.

Once the offer 500 has been transmitted to the potential purchaser(s), the potential purchaser either accepts or declines the offer 500, at block 610. If the potential purchaser declines the offer 500, the seller may make a counter offer, at block 614. If the potential purchaser accepts either the offer at block 610 or makes a counter offer at block 616, the purchaser pays for the intangible property rights, at block 612. Alternatively, the purchaser could pay for the intangible property rights after receiving and inspecting the decrypted and/or high resolution copy of the content.

If the seller sent the potential purchaser an encrypted, watermarked, or obscured copy of the content, the seller then sends the purchaser an encryption key, or alternatively a high resolution copy of the content, at block 618. This may be performed once the purchaser has paid for the content at block 612, accepted the offer at block 610, and/or accepted the counter offer 616.

Although the devices and methods for selling intangible property rights have been described in language specific to certain features and/or methodological acts, it is to be understood that the invention is not necessarily limited to the specific features or acts described. Rather, the specific features and acts are disclosed as exemplary forms of implementing the invention.

The invention claimed is:

1. A system, comprising:
  a processor; and
  a computer-readable medium comprising computer-executable instructions that, when executed by a processor, cause the processor to perform operations, for selling intangible property rights, comprising:
    receiving news-related content selected from a group consisting of a photograph, a video clip, an audio clip, a story, and an interview obtained from an individual that is (A) involved in gathering news and (B) desirous to sell intangible property rights (i) being associated with the content, (ii) being owned by the individual, (iii) being offered for sale by the individual, and (iv) comprising non-exclusive rights that would grant a potential purchaser a limited right to use the received content, the limited right being a limited number of copies;
    identifying, based on each of multiple factors comprising (a) a subject of the content received, (b) an audience for the content received, and (c) the intangible property rights, the potential purchaser for the intangible property rights, wherein the audience for the content received is selected from a group consisting of a national audience and an international audience;
    transmitting, to the potential purchaser, an offer to purchase the intangible property rights; and
    receiving, from the potential purchaser, an acceptance of the offer.

2. The system of claim 1, wherein the non-exclusive rights are limited by a number of times that the received content is permitted to be displayed.

3. The system of claim 1, wherein the operations further comprise receiving a counter offer from the potential purchaser.

4. The system of claim 1, wherein the subject of the content received relates to a political event.

5. The system of claim 1, wherein the subject of the content received relates to a personal interest event.

6. The system of claim 1, wherein the subject of the content received relates to a sporting event.

7. The system of claim 1, wherein the operations further comprise creating the offer to purchase the intangible property rights.

8. A computer-readable storage device comprising computer-executable instructions that, when executed by a processor, cause the processor to perform operations, for selling intangible property rights, comprising:
  receiving news-related content selected from a group consisting of a photograph, a video clip, an audio clip, a story, and an interview obtained from an individual that is (A) involved in gathering news and (B) desirous to sell intangible property rights (i) being associated with the content, (ii) being owned by the individual, (iii) being offered for sale by the individual, and (iv) comprising non-exclusive rights that would grant a potential purchaser a limited right to use the received content, the limited right being a limited number of copies;
  identifying, based on each of multiple factors comprising (a) a subject of the content received, (b) an audience for the content received, and (c) the intangible property rights, the potential purchaser for the intangible property rights, wherein the audience for the content received is selected from a group consisting of a national audience and an international audience;
  transmitting, to the potential purchaser, an offer to purchase the intangible property rights; and
  receiving, from the potential purchaser, an acceptance of the offer.

9. The computer-readable storage device of claim 8, wherein the operations further comprise creating the offer to purchase the intangible property rights.

10. The computer-readable storage device of claim 8, wherein the subject of the content received relates to a sporting event.

11. The computer-readable storage device of claim 8, wherein the subject of the content received relates to a political event.

12. The computer-readable storage device of claim 8, wherein the subject of the content received relates to a personal interest event.

13. The computer-readable storage device of claim 8, wherein the non-exclusive rights are limited by a number of times that the received content is permitted to be displayed.

14. The computer-readable storage device of claim 8, wherein the operations further comprise receiving, from the potential customer, a counter offer.

15. A method, for selling intangible property rights, comprising:

receiving, by a system using a processor, news-related content selected from a group consisting of a photograph, a video clip, an audio clip, a story, and an interview obtained from an individual that is (A) involved in gathering news and (B) desirous to sell intangible property rights (i) being associated with the content, (ii) being owned by the individual, (iii) being offered for sale by the individual, and (iv) comprising non-exclusive rights that would grant a potential purchaser a limited right to use the received content, the limited right being a limited number of copies;

identifying, by the system, based on each of multiple factors comprising (a) a subject of the content received, (b) an audience for the content received, and (c) the intangible property rights, the potential purchaser for the intangible property rights, wherein the audience for the content received is selected from a group consisting of a national audience and an international audience;

transmitting, by the system, to the potential purchaser, an offer to purchase the intangible property rights; and receiving, by the system, an acceptance of the offer from the potential purchaser.

16. The method of claim 15, wherein the subject of the content received relates to a sporting event.

17. The method of claim 15, wherein the subject of the content received relates to an event selected from a group consisting of political event and a personal interest event.

18. The method of claim 15, wherein the non-exclusive rights are limited by a number of times that the received content is permitted to be displayed.

19. The method of claim 15, further comprising receiving, by the system, a counter offer from the potential purchaser.

20. The method of claim 15, further comprising creating, by the system, the offer to purchase the intangible property rights.

* * * * *